(12) United States Patent
Hayward et al.

(10) Patent No.: US 7,579,431 B2
(45) Date of Patent: Aug. 25, 2009

(54) METHOD FOR TREATING EXTREMELY SMALL PARTICLES OF POLYETHYLENE TEREPHTHALATE

(75) Inventors: Donald W. Hayward, Waterville, OH (US); Daniel L. Witham, Toledo, OH (US)

(73) Assignee: Phoenix Technologies International, LLC, Bowling Green, OH (US)

( * ) Notice: Subject to any disclaimer, the term of this patent is extended or adjusted under 35 U.S.C. 154(b) by 51 days.

(21) Appl. No.: 10/547,261

(22) PCT Filed: Aug. 9, 2005

(86) PCT No.: PCT/US2005/028208

§ 371 (c)(1),
(2), (4) Date: Nov. 3, 2006

(87) PCT Pub. No.: WO2006/020603

PCT Pub. Date: Feb. 23, 2006

(65) Prior Publication Data

US 2008/0021194 A1    Jan. 24, 2008

Related U.S. Application Data

(60) Provisional application No. 60/600,585, filed on Aug. 11, 2004.

(51) Int. Cl.
*C08F 6/00* (2006.01)
*C08J 3/00* (2006.01)

(52) U.S. Cl. .......................... 528/503; 241/19; 241/23; 241/24; 241/28; 264/176.1; 264/219; 528/271; 528/272; 528/480; 528/502

(58) Field of Classification Search ............... 264/176.1, 264/219; 528/271, 272, 503, 480, 502; 241/19, 241/23, 24, 28
See application file for complete search history.

(56) References Cited

U.S. PATENT DOCUMENTS

| 3,528,955 | A | 9/1970 | Lippman |
| 4,504,653 | A | 3/1985 | Kuwabara et al. |
| 5,393,473 | A | 2/1995 | Payer et al. |
| 5,540,868 | A | 7/1996 | Stouffer et al. |
| 6,528,009 | B1 | 3/2003 | Barchena |
| 6,706,396 | B1 | 3/2004 | Hayes et al. |
| 2003/0000100 | A1 | 1/2003 | Ludwig et al. |
| 2004/0049062 | A1 | 3/2004 | Bijl et al. |

FOREIGN PATENT DOCUMENTS

JP   10349269   5/2000

*Primary Examiner*—Terressa M Boykin
(74) *Attorney, Agent, or Firm*—Fraser Clemens Martin & Miller LLC; Donald R. Fraser

(57) ABSTRACT

A method for treating extremely small particles of recycled polyethylene terephthalate comprises providing a quantity of RPET particles having an average mean particle size ranging from about 0.0005 inch to about 0.05 inch in diameter, heating the RPET particles to a temperature sufficient to cause at least a portion of the RPET particles to adhere to one another, and forming the adhered RPET particles into pellets, said pellets having substantially the same average surface-to-volume ratio as the bulk, un-adhered RPET particles.

11 Claims, 1 Drawing Sheet

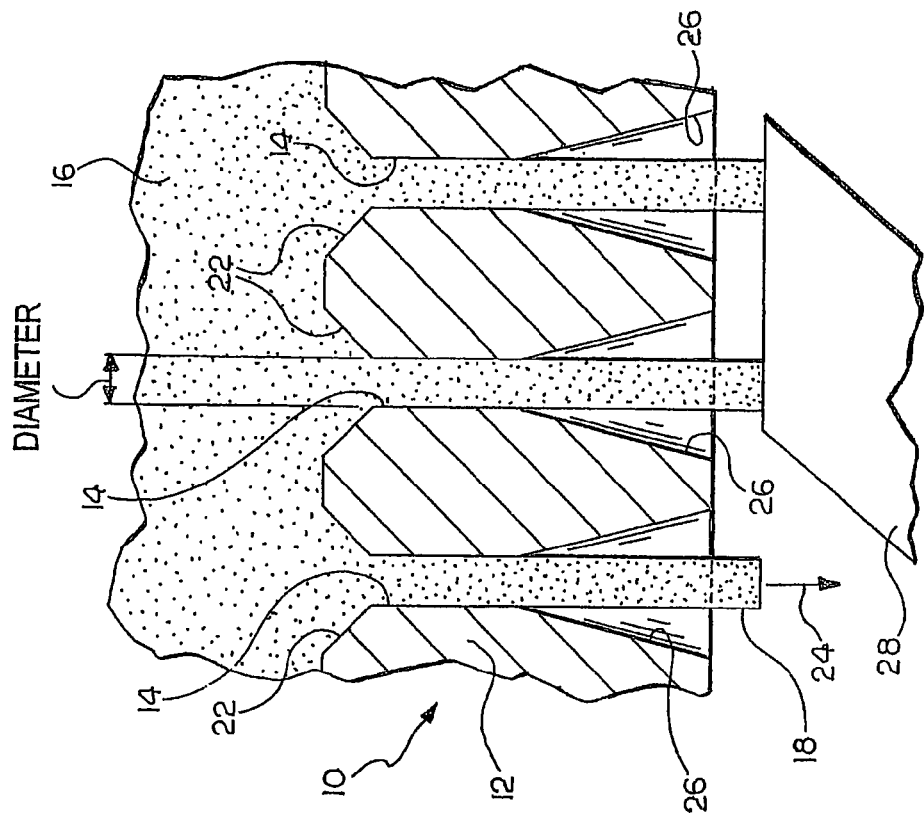
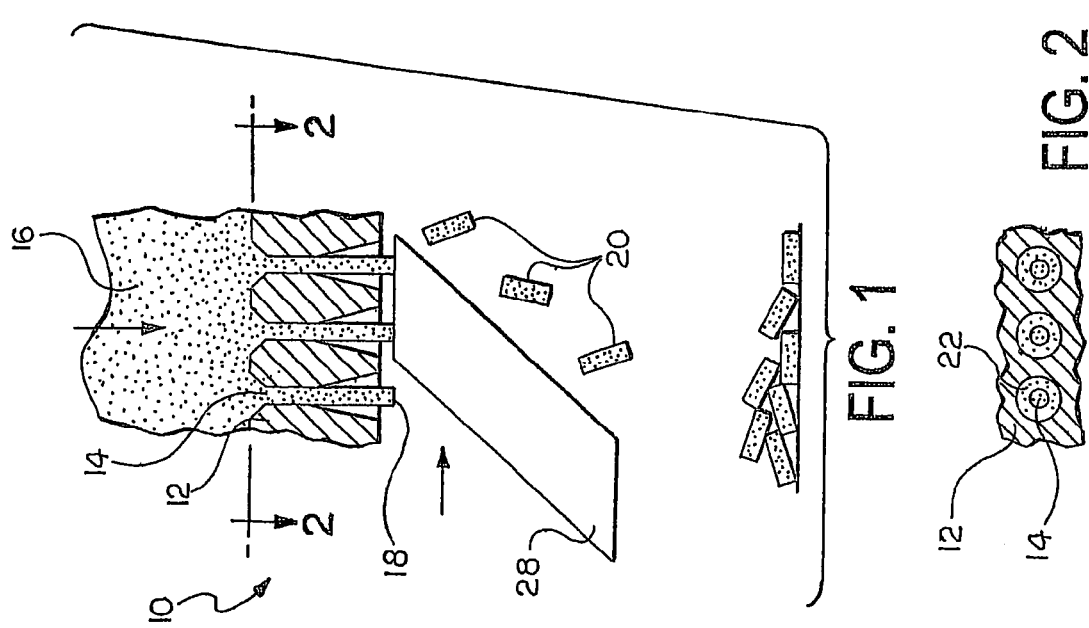

METHOD FOR TREATING EXTREMELY SMALL PARTICLES OF POLYETHYLENE TEREPHTHALATE

CROSS-REFERENCE TO RELATED APPLICATION

This Application claims the benefit of U.S. Provisional Patent Application Ser. No. 60/600,585, filed on Aug. 11, 2004.

FIELD OF THE INVENTION

The present invention relates generally to a method for treating extremely small particles of polyethylene terephthalate (PET). More particularly, the invention is directed toward a process for treating particles of recycled polyethylene terephthalate (RPET), to prepare a stock material that is easier to handle than is a fine powder, yet which substantially retains the processing operability and utility exhibited by extremely small particles of RPET.

BACKGROUND OF THE INVENTION

It has recently been discovered that extremely small particles of RPET exhibit unexpectedly superior processing properties for the production of new plastic articles. U.S. Pat. Nos. 5,734,234 and 5,899,399, for example, disclose that extremely small particles of RPET produced by comminuting RPET flakes may easily be decontaminated and recycled to make plastic containers.

However, extremely small particles of RPET are difficult to transport and otherwise handle. Generally, the handling of fine powders requires specialized equipment such as customized vacuum conveying systems, dense phase conveyors, crystallizers, dryers, bins, tanks, and augers. Such handling equipment is expensive, and costly to operate and maintain. For these reasons, manufacturers prefer to use larger RPET flakes or pellets and conventional handling equipment in the manufacture of plastic articles, but thereby lose the benefits that could otherwise be realized by the use of extremely small particles of RPET.

It would be desirable to treat extremely small particles of RPET, to prepare a stock material that is easy to handle in conventional processing equipment, yet which substantially retains the processing advantages, operability, and utility exhibited by extremely small particles of RPET.

SUMMARY OF THE INVENTION

Accordant with the present invention, a process for treating extremely small particles of RPET to improve handleability surprisingly has been discovered. The process comprises the steps of providing a quantity of RPET particles having an average mean particle size ranging from about 0.0005 inch to about 0.05 inch in diameter, heating the RPET particles to a temperature sufficient to cause a portion of the RPET particles to adhere to one another, and forming the RPET particles into pellets, said pellets having a substantially higher surface-to-volume ratio compared to bulk recycled or virgin resin pellets.

The inventive process is particularly useful for preparing pellets of RPET whose processing advantages, operability, and utility are essentially identical to bulk extremely small particles of RPET, for the ultimate production of plastic articles such as containers.

BRIEF DESCRIPTION OF THE DRAWINGS

The novel features that are considered characteristic of the invention are set forth with particularity in the appended claims. The invention itself, however, will best be understood from the accompanying description of specific embodiments when read in conjunction with the attendant Drawings, in which:

FIG. 1 is a fragmentary elevational view, partly in section, of apparatus for treating extremely small particles of RPET, including a device for heating the RPET particles, extruding the heated, adhered RPET particles, and cutting the extrusions to form pellets;

FIG. 2 is a fragmentary sectional view taken along the line 2-2 of FIG. 1; and

FIG. 3 is an enlarged fragmentary view of the forming passageways of the heated dye illustrated in FIG. 1.

DETAILED DESCRIPTION OF THE PREFERRED EMBODIMENT

A quantity of RPET particles having an average mean particle size ranging from about 0.0005 to about 0.05 inch in diameter is provided, according to the present invention. These extremely small particles of RPET may be formed by grinding or otherwise comminuting readily-available RPET flakes, utilizing conventional equipment such as grinders, ball mills, impact grinders, cryogenic grinders, pulverizers, attrition mills, and the like. A preferred particle size for the RPET particles is about 0.01 inch in diameter (approximately 300 microns). These powder-like RPET particles are very difficult to convey and otherwise handle.

The RPET particles are heated to a temperature sufficient to cause at least a portion of the RPET particles to adhere to one another. Referring now to the Drawings, and particularly FIGS. 1 and 3, there is shown at 10 apparatus for forming the RPET particles, according to the present invention. It comprises a bushing 12 having a plurality of die passageways 14 through which the RPET particles move to form baculiform extrusions 16. Although circular cross-sectional die passageways 14 are illustrated in the Drawings, resulting in pellets having diameters represented by the arrows 30 in FIG. 3, it will be readily apparent to those ordinarily skilled in the art that other cross-sectional configurations (not shown) may be used.

The RPET particles are heated to a temperature at or slightly above the glass transition temperature (Tg) of the RPET from which the particles were derived. Generally, the glass transition temperature for RPET particles is greater than about 70 degrees Celsius. The particles are heated by frictional engagement until at least a portion of them adhere to one another by point contact therebetween. Thus, the particles essentially retain their overall shapes, and the interstitial spaces between the particles are likewise retained in the adhered mass.

The adhered RPET particles are formed into pellets 20, said pellets 20 having substantially the same average surface-to-volume ratio as the bulk, un-adhered RPET particles 18. Although cylindrical pellets 20 are illustrated in Fig., the term "pellet" is contemplated to include all forms of sintered RPET particles 18 including, for example, flakes, spheres, cubes, misshapen chunks, and the like (not shown). As will be readily apparent to one ordinarily skilled in the art, the configuration of the "pellets" will be determined by the process and equipment used to heat and form same.

FIGS. 1, 2, and 3 illustrate that the die passageways 14 are provided with an initial funnel-shaped inlet 22, to assist in the formation of the extrusions 16. Alternatively, the initial portions of the die passageways 14 may be provided with differently-shaped inlets, or none at all (not shown). The adhered RPET particles are urged by conventional, suitable means (such as a ram, rollers, forced gas, gravity, and the like) through the die passageways 14 in the direction of the arrow 24 shown on FIG. 3 to produce the extrusions 16 of adhered RPET particles. The frictional engagement between the individual particles and the walls 22 creates sufficient heat energy so that the adjacent surfaces of the particles in contact with the walls 22 reach the glass transition temperature and tend to adhere to one another. This adherence causes at least the outer layers of particles to form a pellet-like shell around a central mass of unadhered particles forming the extrusions 18.

The extrusions 16 comprising at least partially sintered RPET particles are caused to advance to an adjacent section of the device 10 referred to as the relief section 26, where the walls of the die passageways 14 tend to diverge in the configurations of elongate inverted cones as they extend toward the exits of the die passageways 14.

The extrusions 16 are then caused to exit the die passageways 14. A cut-off knife 28 is caused to traverse the exit zone of the die passageways 14, to sever the extrusions 16, thereby forming pellets 20 of sintered RPET particles. The length of the pellets 20 is determined by the synchronization of the cut-off knife 28 traversal with the velocity of the movement of the extrusions 16. The pellets 20 drop by gravity onto a collection surface which may comprise, for example, a moving conveyor, a collection bin, a conduit leading to other equipment, or the like.

Conveniently, the sintered pellets may then be conveyed by conventional, non-specialized equipment. This form of RPET retains the processing advantages, operability, and utility of extremely small particles of RPET, but eliminates the difficulties and costs associated with the transport and handling of powder-like materials. The pellets mirror the characteristics of the particles of RPET; in that the pellets exhibit a very fast drying time, accelerated diffusion for the removal of contaminants or the infusion of adjuvants, faster build rates for intrinsic viscosity during subsequent solid-stating processes, etc.

The bushing 10 may be heated by conventional means such as, for example, electrical resistance heating, flame heating, infrared radiant heating, hot gas heating, and the like. The bushing 12 is heated in such a manner so that the bulk RPET particles 18 contained within the bushing 12 attain, by friction between the particles or by conduction and/or convection of the thermal energy from the bushing 12, a temperature sufficient to cause at least a portion of the RPET particles 18 to adhere to one another.

The invention is more easily comprehended by reference to specific embodiments recited hereinabove which are representative of the invention. It must be understood, however, that the specific embodiments are provided only for the purpose of illustration, and that the invention may be practiced otherwise than as specifically illustrated without departing from its spirit and scope.

What is claimed is:

1. A process for treating extremely small particles of RPET, comprising:
    providing a quantity of RPET particles having an average mean particle size ranging from about 0.0005 inch to about 0.05 inch in diameter;
    heating the RPET particles to a temperature sufficient to cause at least a portion of the RPET particles to adhere to one another; and
    forming the adhered RPET particles into pellets, said pellets having substantially the same average surface-to-volume ratio as the bulk, un-adhered RPET particles.

2. The process according to claim 1, wherein the average mean particle size of the RPET particles is about 0.01 inch in diameter.

3. The process according to claim 1, wherein the heating is accomplished by electrical resistance heating, flame heating, infrared radiant heating, or hot gas heating.

4. The process according to claim 1, wherein the heating is accomplished by frictional engagement between the particles.

5. The process according to claim 1, wherein at least some of the RPET particles are heated to a temperature greater than or equal to their glass transition temperature.

6. The process according to claim 1, wherein the RPET particles are heated to a temperature greater than about 70 degrees Celsius.

7. The process according to claim 1, wherein the pellets are formed into cylinders, flakes, spheres, cubes, or misshapen chunks.

8. The process according to claim 1, wherein the pellets are formed by passing the heated RPET particles through die passageways.

9. A process for treating extremely small particles of RPET, comprising:
    providing a quantity of RPET particles having an average mean particle size about 0.01 inch in diameter;
    heating the RPET particles, by frictional engagement, electrical resistance heating, flame heating, infrared radiant heating, or hot gas heating, to a temperature greater than or equal to their glass transition temperature, to cause at least a portion of the RPET particles to adhere to one another; and
    forming the adhered RPET particles into pellets in the form of cylinders, flakes, spheres, cubes, or misshapen chunks, by passing the heated RPET particles through die passageways, said pellets having substantially the same average surface-to-volume ratio as the bulk, un-adhered RPET particles.

10. The process according to claim 9, wherein the RPET particles are heated to a temperature greater than about 70 degrees Celsius.

11. A process for treating extremely small particles of RPET, comprising:
    providing a quantity of RPET particles having an average mean particle size about 0.01 inch in diameter;
    heating the RPET particles, by frictional engagement, electrical resistance heating, flame heating, infrared radiant heating, or hot gas heating, to a temperature greater than about 70 degrees Celsius, to cause at least a portion of the RPET particles to adhere to one another; and
    forming the RPET particles into pellets in the form of cylinders, flakes, spheres, cubes, or misshapen chunks, by passing the RPET particles through die passageways, said pellets having substantially the same average surface-to-volume ratio as the bulk, un-adhered RPET particles.

* * * * *